(12) United States Patent  
Shershnyov et al.

(10) Patent No.: US 11,815,026 B2
(45) Date of Patent: Nov. 14, 2023

(54) COMBUSTOR NOZZLE, AND COMBUSTOR AND GAS TURBINE INCLUDING THE SAME

(71) Applicant: DOOSAN ENERBILITY CO., LTD, Changwon-si (KR)

(72) Inventors: Borys Shershnyov, Changwon (KR); Mu Hwan Chon, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 58 days.

(21) Appl. No.: 17/367,440

(22) Filed: Jul. 5, 2021

(65) Prior Publication Data

US 2022/0003167 A1 Jan. 6, 2022

(30) Foreign Application Priority Data

Jul. 6, 2020 (KR) .......................... 10-2020-0082980

(51) Int. Cl.
*F02C 7/00* (2006.01)
*F02C 7/232* (2006.01)
*F23R 3/28* (2006.01)

(52) U.S. Cl.
CPC ................ *F02C 7/232* (2013.01); *F23R 3/28* (2013.01); *F05D 2220/32* (2013.01); *F05D 2240/36* (2013.01)

(58) Field of Classification Search
None
See application file for complete search history.

(56) References Cited

U.S. PATENT DOCUMENTS

| 2,174,266 | A | * | 9/1939 | Jackson | F23R 3/14 60/39.38 |
| 5,505,045 | A | * | 4/1996 | Lee | F23R 3/14 60/737 |
| 5,603,211 | A | * | 2/1997 | Graves | F23C 7/002 60/776 |
| 6,272,840 | B1 | * | 8/2001 | Crocker | F23D 11/107 239/404 |
| 2002/0011070 | A1 | * | 1/2002 | Mandai | F23R 3/14 60/725 |

(Continued)

FOREIGN PATENT DOCUMENTS

EP 1488086 B1 11/2012
JP 2005180730 A 7/2005
(Continued)

*Primary Examiner* — Edwin Kang
(74) *Attorney, Agent, or Firm* — Harvest IP Law, LLP

(57) ABSTRACT

A combustor nozzle capable of injecting fuel uniformly, and a combustor and gas turbine including the same are provided. The combustor nozzle includes a main cylinder having a fuel passage through which fuel flows, a nozzle shroud surrounding the main cylinder, and a fuel injection module disposed between the main cylinder and the nozzle shroud to inject fuel, wherein the fuel injection module includes a plurality of first struts protruding from the main cylinder and having strut injection holes to inject fuel, a first support tube coupled to outer ends of the first struts, and a plurality of second struts protruding from the first support tube and having strut injection holes to inject fuel, and each of the first and second struts includes a swirl guide inclined with respect to a longitudinal direction of the main cylinder.

17 Claims, 7 Drawing Sheets

(56) References Cited

U.S. PATENT DOCUMENTS

| | | | |
|---|---|---|---|
| 2002/0192615 A1* | 12/2002 | Moriya | F23D 14/02 |
| | | | 431/278 |
| 2004/0050057 A1 | 3/2004 | Bland | |
| 2005/0268618 A1* | 12/2005 | Johnson | F23R 3/286 |
| | | | 60/737 |
| 2006/0000216 A1* | 1/2006 | Dinu | F23R 3/40 |
| | | | 60/723 |
| 2006/0248898 A1* | 11/2006 | Buelow | F23R 3/14 |
| | | | 60/776 |
| 2009/0056336 A1* | 3/2009 | Chila | F23R 3/14 |
| | | | 60/737 |
| 2010/0037614 A1 | 2/2010 | York | |
| 2010/0058767 A1* | 3/2010 | Simons | F23R 3/34 |
| | | | 60/748 |
| 2010/0077760 A1 | 4/2010 | Laster | |
| 2012/0015309 A1 | 1/2012 | Stewart | |
| 2012/0186255 A1* | 7/2012 | Parsania | F23R 3/36 |
| | | | 60/734 |
| 2012/0291447 A1 | 11/2012 | Boardman | |
| 2017/0241339 A1* | 8/2017 | Yamauchi | F02C 3/30 |

FOREIGN PATENT DOCUMENTS

| | | |
|---|---|---|
| JP | 2006329587 A | 12/2006 |
| JP | 2010281483 A | 12/2010 |
| KR | 20190093305 A | 8/2019 |
| KR | 1020200038698 A | 4/2020 |

* cited by examiner

COMBUSTOR NOZZLE, AND COMBUSTOR AND GAS TURBINE INCLUDING THE SAME

CROSS-REFERENCE TO RELATED APPLICATION

This application claims priority to Korean Patent Application No. 10-2020-0082980, filed on Jul. 6, 2020, the disclosure of which is incorporated herein by reference in its entirety.

BACKGROUND

Technical Field

Apparatuses and methods consistent with exemplary embodiments relate to a combustor nozzle, and a combustor and gas turbine including the same.

Description of the Related Art

A gas turbine is a power engine that mixes air compressed by a compressor with fuel for combustion and rotates a turbine with hot gas produced by the combustion. The gas turbine is used to drive a generator, an aircraft, a ship, a train, or the like.

This gas turbine includes a compressor, a combustor, and a turbine. The compressor sucks and compresses outside air, and transmits the compressed air to the combustor. The air compressed by the compressor has high-pressure and high-temperature. The combustor mixes the compressed air compressed by the compressor with fuel and burns a mixture thereof to produce combustion gas that is discharged to the turbine. Turbine blades in the turbine are rotated by the combustion gas to generate power. The generated power is used in various fields, such as generating electric power and actuating machines.

Fuel is injected through a nozzle installed in each combustor section of the combustor, and gas fuel may be premixed inside the nozzle and injected through the nozzle. To reduce NOx, fuel and air must be uniformly mixed. However, a related art combustor nozzle has a problem in which fuel and air are not uniformly mixed.

SUMMARY

Aspects of one or more exemplary embodiments provide a combustor nozzle that enables uniform injection of fuel, and a combustor and gas turbine including the same.

Additional aspects will be set forth in part in the description which follows and, in part, will become apparent from the description, or may be learned by practice of the exemplary embodiments.

According to an aspect of an exemplary embodiment, there is provided a combustor nozzle including: a main cylinder having a fuel passage through which fuel flows; a nozzle shroud surrounding the main cylinder; and a fuel injection module disposed between the main cylinder and the nozzle shroud to inject fuel, wherein the fuel injection module includes a plurality of first struts protruding from the main cylinder and having strut injection holes to inject fuel, a first support tube coupled to outer ends of the first struts, and a plurality of second struts protruding from the first support tube and having strut injection holes to inject fuel, and each of the first and second struts includes a swirl guide inclined with respect to a longitudinal direction of the main cylinder.

The swirl guide of the first strut and the swirl guide of the second strut may be inclined at different angles with respect to the longitudinal direction of the main cylinder.

Each of the first and second struts may further include an inflow guide extending in the longitudinal direction of the main cylinder. A first angle of inclination, which is an acute angle formed by an extension line of the inflow guide of the first strut and an extension line of the swirl guide of the first strut, may be smaller than a second angle of inclination, which is an acute angle formed by an extension line of the inflow guide of the second strut and an extension line of the swirl guide of the second strut.

A plurality of intermediate injection holes for injecting fuel may be formed in the first support tube.

A contraction region in which a passage area gradually decreases and an expansion region in which a passage area gradually increases forward may be formed between the first support tube and a second support tube.

The strut injection holes may be formed in the contraction region.

An intermediate delivery passage may be formed in the first support tube to circumferentially extend.

Each of the first and second struts may have a strut passage formed to extend in a height direction of the first strut, and the intermediate delivery passage may be connected to the strut passage.

The fuel injection module may further include a second support tube configured to connect outer sides of the second struts and a plurality of third struts protruding from the second support tube. Each of the plurality of third struts may include a swirl guide inclined with respect to the longitudinal direction of the main cylinder.

Each of the first, second, and third struts may further include an inflow guide extending in the longitudinal direction of the main cylinder. A first angle of inclination, which is an acute angle formed by an extension line of the inflow guide of the first strut and an extension line of the swirl guide of the first strut, may be smaller than a second angle of inclination, which is an acute angle formed by an extension line of the inflow guide of the second strut and an extension line of the swirl guide of the second strut, and a third angle of inclination, which is an acute angle formed by an extension line of the inflow guide of the third strut and an extension line of the swirl guide of the third strut, may be greater than the first angle of inclination and smaller than the second angle of inclination.

The main cylinder may include an inner tube and an outer tube surrounding the inner tube. A plurality of pegs for injecting fuel to guide a flow of air and mixing bars for mixing the air and fuel injected from the pegs may be installed between the inner tube and the outer tube, and each of the mixing bars may be twisted.

Each of the plurality of pegs may include a connection passage to supply fuel to the fuel injection module and an injection passage to supply fuel to an injection hole formed in an inner vain, and the connection passage may be separated from the injection passage.

The mixing bar may include a twisted part and a first flat part fixed to a front of the twisted part, and the twisted part may have a rear end fixed to a front of an associated one of the plurality of pegs.

The twisted part of the mixing bar may include a first section rotated by 180 degrees and a second section positioned in front of the first section and rotated by 180 degrees, and the second section may have a greater length than the first section.

A torsional guide may be installed between the mixing bars, and the torsional guide may be twisted with respect to a central axis thereof.

The torsional guide may include a twisted part, a first flat part fixed to a front of the twisted part, and a second flat part fixed to a rear of the twisted part, and the first and second flat parts may be disposed parallel to a radial direction of the main cylinder.

According to an aspect of another exemplary embodiment, there is provided a combustor including: a burner having a plurality of nozzles configured to inject fuel and air, and a duct assembly coupled to one side of the burner to burn a mixture of the fuel and air and transmit combustion gas to a turbine, wherein each of the plurality of nozzles includes a main cylinder having a fuel passage through which fuel flows, a nozzle shroud surrounding the main cylinder, and a fuel injection module disposed between the main cylinder and the nozzle shroud to inject fuel, wherein the fuel injection module includes a plurality of first struts protruding from the main cylinder and having strut injection holes to inject fuel, a first support tube coupled to outer ends of the first struts, and a plurality of second struts protruding from the support tube and having strut injection holes to inject fuel, and each of the first and second struts includes a swirl guide inclined with respect to a longitudinal direction of the main cylinder.

The swirl guide of the first strut and the swirl guide of the second strut may be inclined at different angles with respect to the longitudinal direction of the main cylinder.

According to an aspect of another exemplary embodiment, there is provided a gas turbine including: a compressor configured to compress air introduced from an outside, a combustor configured to mix fuel with the air compressed by the compressor and combust a mixture of the fuel and air to produce combustion gas, and a turbine having a plurality of turbine blades rotated by combustion gas produced by the combustor, wherein the combustor includes a burner having a plurality of nozzles configured to inject fuel and air, and a duct assembly coupled to one side of the burner to burn the mixture of the fuel and air and transmit combustion gas to the turbine, wherein each of the plurality of nozzles includes a main cylinder having a fuel passage through which fuel flows, a nozzle shroud surrounding the main cylinder, and a fuel injection module disposed between the main cylinder and the nozzle shroud to inject fuel, wherein the fuel injection module includes a plurality of first struts protruding from the main cylinder and having strut injection holes to inject fuel, a first support tube coupled to outer ends of the first struts, and a plurality of second struts protruding from the support tube and having strut injection holes to inject fuel, and each of the first and second struts includes a swirl guide inclined with respect to a longitudinal direction of the main cylinder.

The swirl guide of the first strut and the swirl guide of the second strut may be inclined at different angles with respect to the longitudinal direction of the main cylinder.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
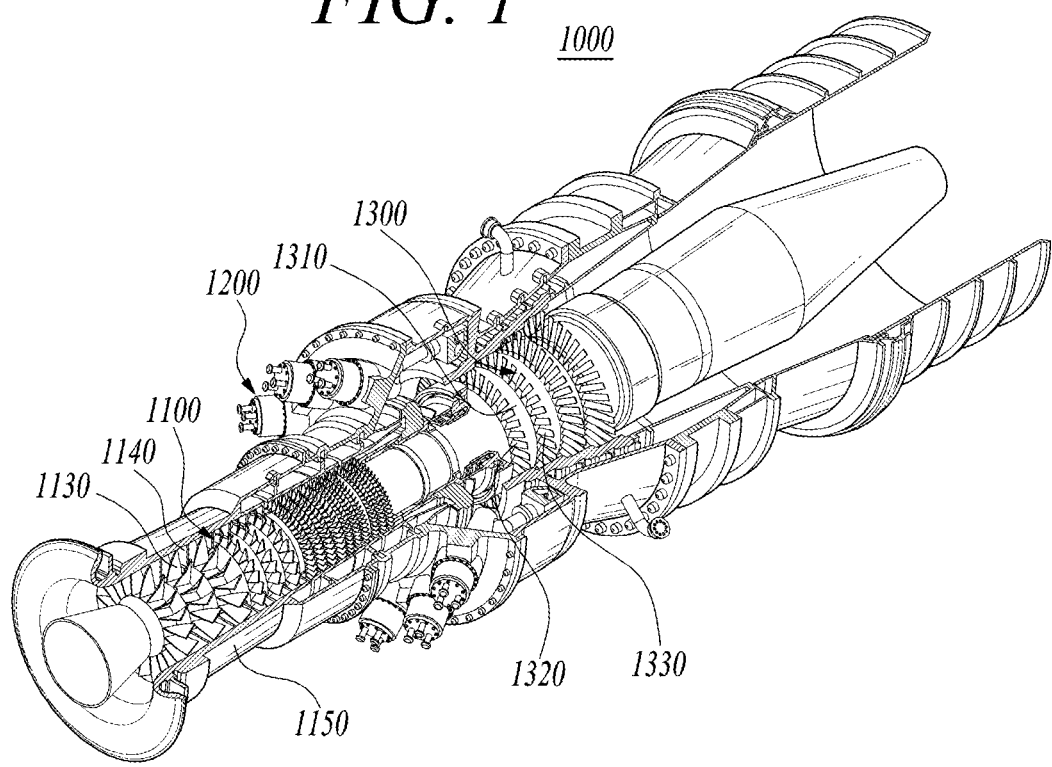
FIG. 1 is a view illustrating an interior of a gas turbine according to a first exemplary embodiment.

Various modifications and various embodiments will be described below in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Hereinafter, exemplary embodiments will be described in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Hereinafter, a gas turbine according to a first exemplary embodiment will be described with reference to the accompanying drawings.

Figure 2:
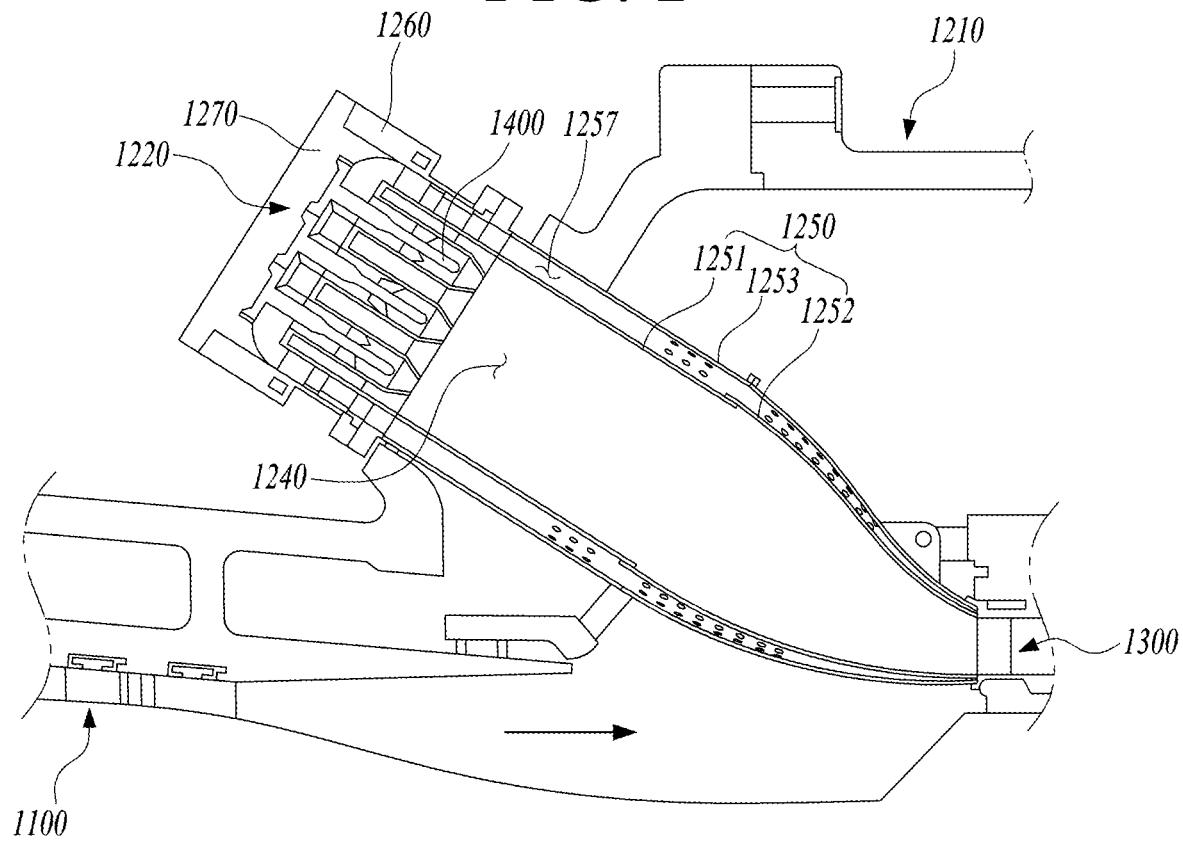
FIG. 2 is a view illustrating a combustor of FIG. 1.

FIG. 1 is a view illustrating an interior of the gas turbine according to the first exemplary embodiment. FIG. 2 is a view illustrating a combustor of FIG. 1.

An ideal thermodynamic cycle of a gas turbine 1000 may ideally comply with the Brayton cycle. The Brayton cycle consists of four phases including an isentropic compression (i.e., an adiabatic compression), an isobaric heat addition, an isentropic expansion (i.e., an adiabatic expansion), and an isobaric heat dissipation. In other words, in the Brayton cycle, thermal energy may be released by combustion of fuel in an isobaric environment after the atmospheric air is sucked and compressed to a high pressure, hot combustion gas may be expanded to be converted into kinetic energy, and exhaust gas with residual energy may then be discharged to the atmosphere. As such, the Brayton cycle consists of four thermodynamic processes, i.e., compression, heating, expansion, and exhaust.

The gas turbine 1000 employing the Brayton cycle may include a compressor 1100, a combustor 1200, and a turbine 1300. Although the following description is given with reference to FIG. 1, the present disclosure may be widely applied to a gas turbine having the same configuration as the gas turbine 1000 illustrated in FIG. 1.

Referring to FIG. 1, the compressor 1100 of the gas turbine 1000 may suck air from the outside and compress the air. The compressor 1100 may supply the air compressed by compressor blades 1130 to the combustor 1200 and also supply cooling air to a high temperature region of the gas turbine 1000. In this case, because the air sucked into the compressor 1100 is compressed in the compressor 1100 through an adiabatic compression process, the pressure and temperature of the air passing through the compressor 1100 increase.

The compressor 1100 may be designed in the form of a centrifugal compressor or an axial compressor. In general, the centrifugal compressor is applied to a small gas turbine, whereas the multistage axial compressor 1100 is applied to the large gas turbine 1000 as illustrated in FIG. 1 to compress a large amount of air. In the multistage axial compressor 1100, the compressor blades 1130 rotate along with the rotation of rotor disks, compress the introduced air and deliver the compressed air to compressor vanes 1140 disposed at a following stage. The air is compressed gradually to a high pressure while passing through the compressor blades 1130 formed in a multistage manner.

A plurality of compressor vanes 1140 may be mounted in a compressor casing 1150 in such a way that the plurality of compressor vanes 1140 form each stage. The compressor vanes 1140 guide the compressed air moved from compressor blades 1130 disposed at a preceding stage to compressor blades 1130 disposed at a following stage. For example, at least some of the plurality of compressor vanes 1140 may be mounted so as to be rotatable within a predetermined range, e.g., to adjust the inflow rate of air.

The compressor 1100 may be driven by some of the power output from the turbine 1300. To this end, a rotary shaft of the compressor 1100 may be directly connected to a rotary shaft of the turbine 1300, as illustrated in FIG. 1. In the case of the large-scale gas turbine 1000, the compressor 1100 may require almost half of the power generated by the turbine 1300 for driving. Accordingly, an overall efficiency of the gas turbine 1000 can be enhanced by directly increasing the efficiency of the compressor 1100.

The turbine 1300 includes a plurality of rotor disks 1310, a plurality of turbine blades 1320 radially arranged on each of the rotor disks 1310, and a plurality of turbine vanes 1330. Each of the rotor disks 1310 has a substantially disk shape, and a plurality of grooves are formed on an outer peripheral portion thereof. The grooves are formed to have a curved surface so that the turbine blades 1320 are inserted into the grooves, and the turbine vanes 1330 are mounted in a turbine casing. The turbine blades 1320 may be coupled to the rotor disk 1310 in a manner such as a dovetail connection. The turbine vanes 1330 are fixed so as not to rotate and guide a flow direction of the combustion gas passing through the turbine blades 1320. The turbine blades 1320 generate rotational force while rotating by the combustion gas.

The combustor 1200 may mix the compressed air supplied from an outlet of the compressor 1100 with fuel for isobaric combustion to produce combustion gas with high energy.

FIG. 2 illustrates an example of the combustor 1200 applied to the gas turbine 1000. The combustor 1200 may include a combustor casing 1210, a burner 1220, and a duct assembly 1250.

The combustor casing 1210 may have a substantially cylindrical shape to surround a plurality of burners 1220. The burners 1220 may be disposed along the annular combustor casing 1210 downstream of the compressor 1100. Each of the burners 1220 includes a plurality of nozzles 1400, and the fuel injected from the nozzles 1400 is mixed with air at an appropriate rate so that the mixture thereof is suitable for combustion.

The gas turbine 1000 may use gas fuel, liquid fuel, or composite fuel as a combination thereof. For the gas turbine, it is important to make a combustion environment for reducing an amount of emission such as carbon monoxide or nitrogen oxide that is subject to legal regulations. Accordingly, premixed combustion scheme has been increasingly used in recent years in that it enables uniform combustion to reduce emission by lowering a combustion temperature even though it is difficult to control the premixed combustion.

In the case of premixed combustion, compressed air is mixed with the fuel pre-injected from the nozzles 1400 in advance, and then enters a combustion chamber 1240. When combustion is stable after premixed gas is initially ignited by an igniter, the combustion state is maintained by supplying fuel and air.

Referring to FIG. 2, compressed air is supplied to the nozzles 1400 along an outer surface of the duct assembly 1250, which connects a section between the burners 1220 and the turbine 1300 so that high-temperature combustion gas flows to heat the duct assembly 1250, thereby properly cooling the heated duct assembly 1250.

The duct assembly 1250 may include a liner 1251, a transition piece 1252, and a flow sleeve 1253. The duct assembly 1250 has a double-wall structure in which the flow sleeve 1253 surrounds the liner 1251 and the transition piece 1252. The liner 1251 and the transition piece 1252 are cooled by the compressed air permeated into a cooling passage 1257 formed inside the flow sleeve 1253.

The liner 1251 is a tubular member connected to the burner 1220 of the combustor 1200, and the combustion chamber 1240 is an internal space of the liner 1251. The liner 1251 has one longitudinal end coupled to the burner 1220 and the other longitudinal end coupled to the transition piece 1252.

The transition piece 1252 is connected to an inlet of the turbine 1300 to guide high-temperature combustion gas to the turbine 1300. The transition piece 1252 has one longitudinal end coupled to the liner 1251 and the other longitudinal end coupled to the turbine 1300. The flow sleeve 1253 serves to protect the liner 1251 and the transition piece 1252 to prevent high-temperature heat from being directly released to the outside.

A nozzle casing 1260 is coupled and installed to an end of the duct assembly 1250, and a head plate 1270 supporting the nozzles 1400 is coupled and installed to the nozzle casing 1260.

The nozzle casing 1260 has a substantially circular tube shape to surround a plurality of nozzles 1400. The nozzle casing 1260 has one end coupled to the duct assembly 1250 and the other end coupled to the head plate 1270 installed at a rear of the nozzle casing 1260. The plurality of nozzles 1400 may be installed inside the nozzle casing 1260 such that the plurality of nozzles 1400 are spaced apart in the circumferential direction of the nozzle casing 1260.

The head plate 1270 has a disk shape and is coupled to the nozzle casing 1260 to support the nozzles 1400. The head plate 1270 may be equipped with the plurality of nozzles 1400 and a fuel injector for supplying fuel to the nozzles 1400. A nozzle flange 1470 for supporting each nozzle may be fixed to the head plate 1270.

Figure 3:
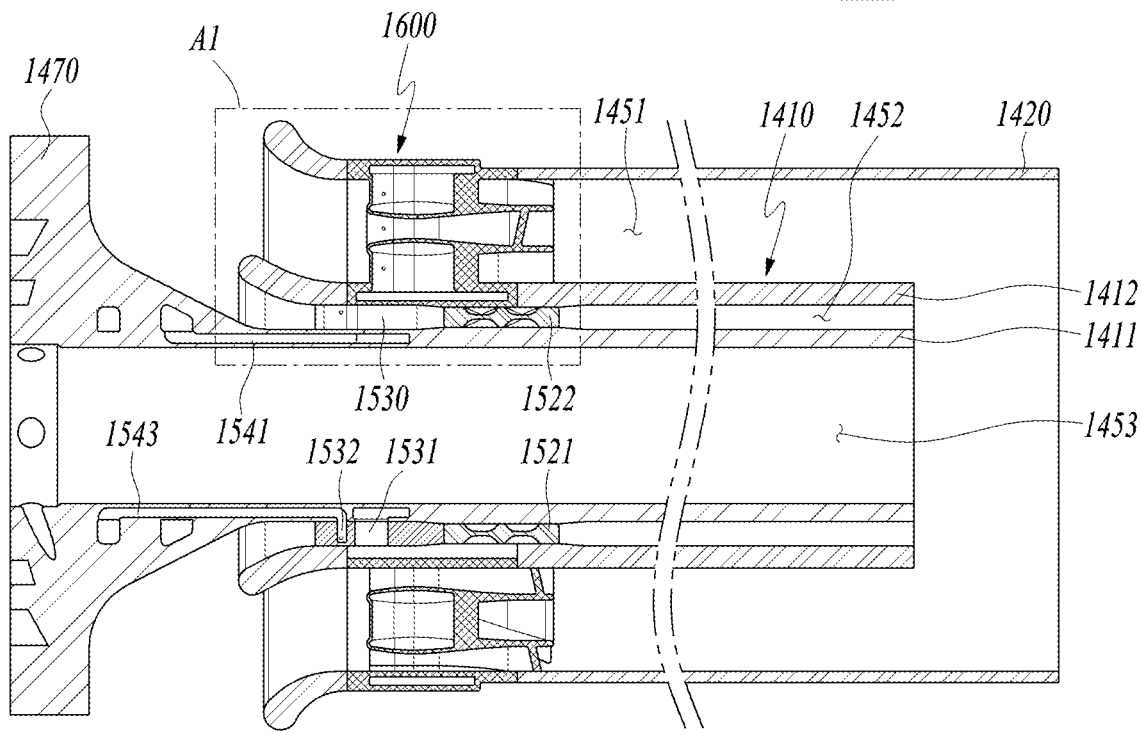
FIG. 3 is a longitudinal cross-sectional view of one nozzle according to the first exemplary embodiment.
Figure 4:
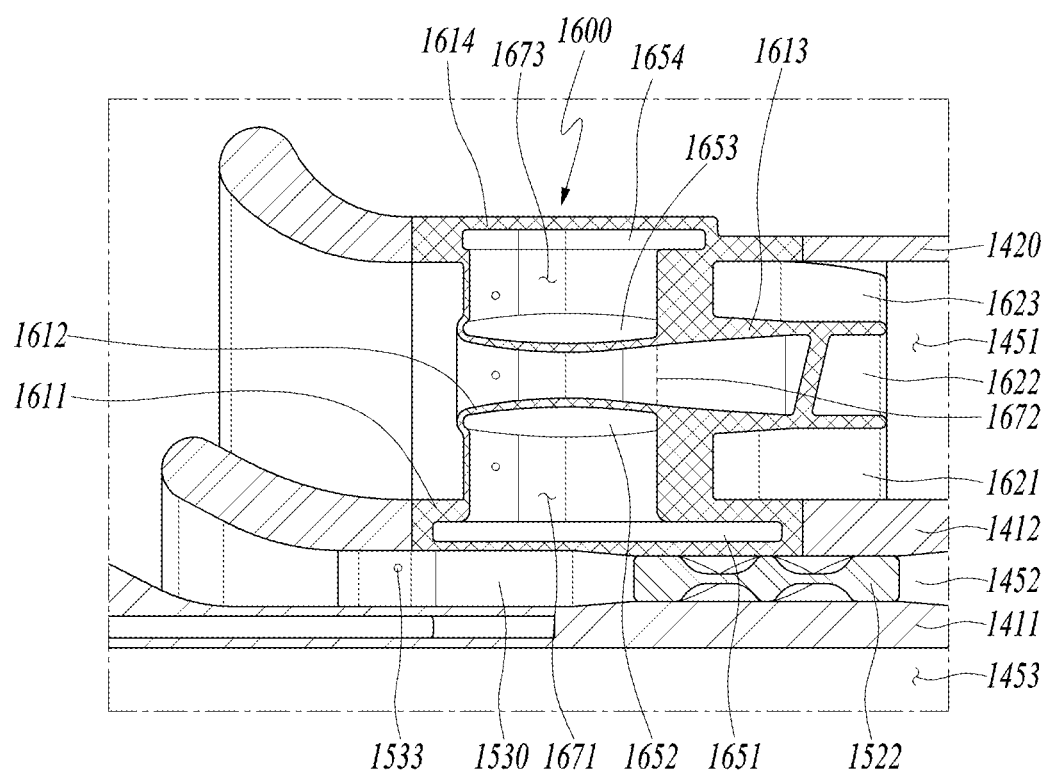
FIG. 4 is an enlarged view illustrating area A1 in FIG. 3.
Figure 5:
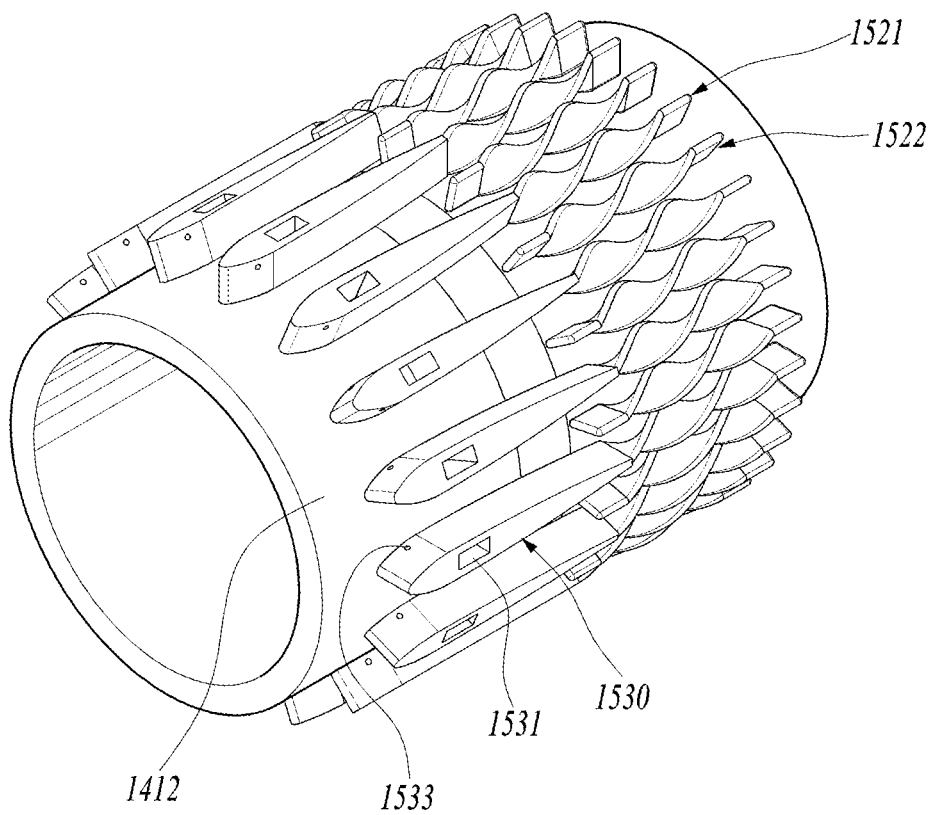
FIG. 5 is a perspective view illustrating an inner tube, pegs, and mixing bars according to the first exemplary embodiment.
Figure 6:
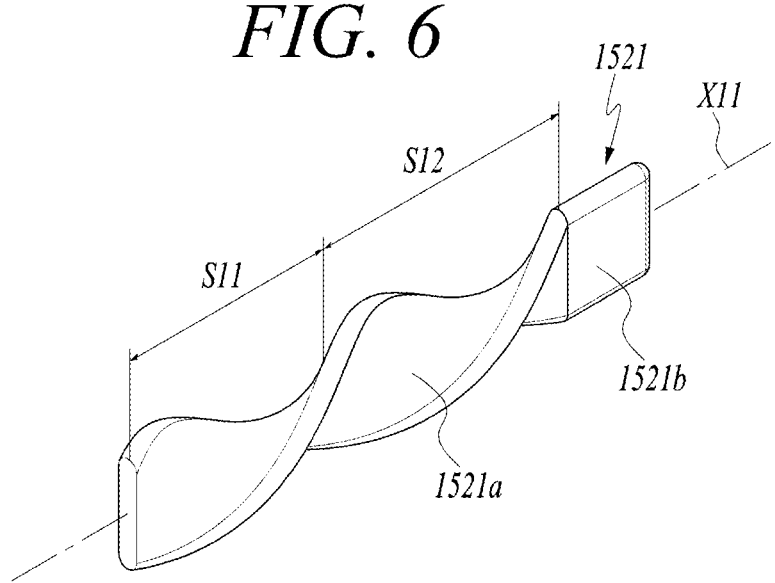
FIG. 6 is a perspective view illustrating one mixing bar according to the first exemplary embodiment.
Figure 7:
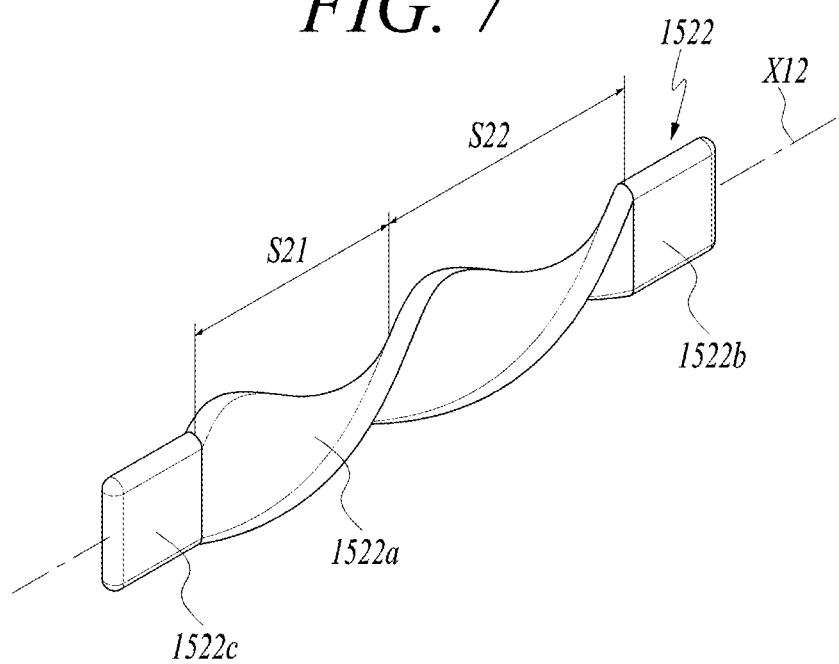
FIG. 7 is a perspective view illustrating one torsional guide according to the first exemplary embodiment.

FIG. 3 is a longitudinal cross-sectional view of a nozzle according to the first exemplary embodiment. FIG. 4 is an enlarged view illustrating area A1 in FIG. 3. FIG. 5 is a perspective view illustrating an inner tube, pegs, and mixing bars according to the first exemplary embodiment. FIG. 6 is a perspective view illustrating one mixing bar according to the first exemplary embodiment. FIG. 7 is a perspective view illustrating one torsional guide according to the first exemplary embodiment.

Referring to FIGS. 3 to 5, the nozzle 1400 includes a main cylinder 1410, a nozzle shroud 1420 surrounding the main cylinder 1410, a fuel injection module 1600 for injecting fuel between the main cylinder 1410 and the nozzle shroud 1420, pegs 1530 installed inside the main cylinder 1410, and mixing bars 1521 disposed in front of the pegs 1530. Here, the front and rear sides are based on an air flow direction in the nozzle 1400.

The main cylinder 1410 and the nozzle shroud 1420 have a coaxial structure, and fuel and air are supplied into the main cylinder 1410. A first premixing passage 1451 through which air flows is formed in a space between the nozzle shroud 1420 and the main cylinder 1410, and fuel may be injected into the first premixing passage 1451. The main cylinder 1410 may include an inner tube 1411, an outer tube 1412 surrounding the inner tube 1411, and a distribution member coupled to the inner tube 1411 and the outer tube 1412 to supply fuel to the fuel injection module 1600.

A second premixing passage 1452 is formed between the inner tube 1411 and the outer tube 1412, and the first premixing passage 1451 is formed between the nozzle shroud 1420 and the main cylinder 1410. A main fuel passage 1453 may be formed inside the inner tube 1411 so that liquid fuel is supplied therethrough. However, it is understood that the fuel is not limited thereto, and gas fuel may be supplied to the main fuel passage 1453. A blunt body for dispersing liquid fuel may also be installed in front of the main fuel passage 1453.

Air may be introduced into the first premixing passage 1451 and the second premixing passage 1452, and an inlet through which air is introduced may be formed at rear ends of the nozzle shroud 1420 and the outer tube 1412. Gas fuel may be injected into the first premixing passage 1451 and the second premixing passage 1452.

The inner tube 1411 has a rear end connected to the nozzle flange 1470 to receive fuel from the nozzle flange 1470. The inner tube 1411 may have a plurality of first fuel passages 1541 to supply fuel to the fuel injection module 1600 and a plurality of second fuel passages 1543 to supply fuel into the pegs 1530.

The plurality of first and second fuel passages 1541 and 1543 may be formed inside the inner tube 1411 such that the first fuel passages 1541 and the second fuel passages 1543 are spaced apart each other in the circumferential direction of the inner tube 1411.

The pegs 1530 and the mixing bars 1521 are installed inside the main cylinder 1410, e.g., between the inner tube 1411 and the outer tube 1412. The pegs 1530 serve to inject fuel into the space between the inner tube 1411 and the outer tube 1412 and to guide an air flow.

A connection passage 1531 for supplying fuel to the fuel injection module 1600 and an injection passage 1532 for supplying fuel to a vane injection hole 1533 formed in the peg 1530 are formed inside the peg 1530. The connection passage 1531 and the injection passage 1532 are separated so that the fuel in the connection passage 1531 and the fuel in the injection passage 1532 are not mixed. The injection passage 1532 may be positioned behind the connection passage 1531.

The mixing bars 1521 are positioned in front of the pegs 1530 between the inner tube 1411 and the outer tube 1412. Accordingly, air is introduced into the mixing bars 1521 along with the fuel injected from the pegs 1530. Each of the mixing bars 1521 has an elongated rectangular plate shape and has a twisted structure with respect to a central axis X11 of the mixing bar 1521. The mixing bar 1521 may be twisted at an angle from 90 degrees to 720 degrees. Accordingly, the mixing bar 1521 has a spirally extending side end.

The main cylinder 1410 has torsional guides 1522 each positioned between adjacent ones of the mixing bars 1521 therein. The torsional guides 1522 may be positioned in front of spaces between the pegs 1530. Each of the torsional guides 1522 has an elongated rectangular plate shape and has a twisted structure with respect to a central axis X12 of the torsional guide 1522. The torsional guide 1522 may be twisted at an angle from 90 degrees to 720 degrees. Accordingly, the torsional guide 1522 has a spirally extending side end.

The mixing bar 1521 and the torsional guide 1522 may be alternately arranged in the circumferential direction of the main cylinder 1410, and the mixing bar 1521 and the torsional guide 1522 may be arranged so that the sides thereof overlap for efficient mixing of fuel. However, it is understood that this is not limited thereto, and the mixing bar 1521 and the torsional guide 1522 may be spaced apart at intervals. In addition, the mixing bar 1521 and the torsional guide 1522 may be twisted in the same direction.

Referring to FIG. 6, the mixing bar 1521 includes a twisted part 1521*a* and a first flat part 1521*b* fixed to a front of the twisted part 1521*a*. The twisted part 1521*a* has a rear end fixed to a tip of an associated one of the pegs 1530 so that the mixing bar 1521 mixes air with fuel injected from the peg 1530. The first flat part 1521*b* may be disposed parallel to a radial direction of the main cylinder 1410, so that an inner end of the first flat part 1521*b* is fixed to the inner tube 1411 and an outer end of the first flat part 1521*b* is fixed to the outer tube 1412.

The twisted part 1521*a* may include a first section S11 rotated by 180 degrees at a portion connected to the peg 1530 and a second section S12 rotated by 180 degrees at a tip of the first section S11, and a length of the second section S12 may be longer than a length of the first section S11. The twisted part 1521*a* may be formed to become more open as it goes forward in the second section S12.

Accordingly, in the first section S11 of the mixing bar 1521, fuel and air may be mixed to obtain a strong rotational force, and flow forward with the rotational force at an increased flow rate compared to the first section S11 so that swirls spread and are mixed with swirls from the torsional guide 1522 containing more air, resulting in a more even mixture of fuel and air.

Referring to FIG. 7, the torsional guide 1522 includes a twisted part 1522*a*, a first flat part 1522*b* fixed to a front of the twisted part 1522*a*, and a second flat part 1522*c* fixed to a rear of the twisted part 1522*a*. The first and second flat parts 1522*b* and 1522*c* have a flat plate shape and are spaced apart from each other with the twisted part 1522*a* interposed therebetween. The twisted part 1522*a* has a structure in which a flat rod is twisted.

The first and second flat parts 1522*b* and 1522*c* may be disposed parallel to the radial direction of the main cylinder 1410. To this end, the twisted part 1522*a* may be twisted by 360 degrees. When the first and second flat parts 1522*b* and 1522*c* are disposed in the radial direction of the main cylinder 1410, the first and second flat parts 1522*b* and 1522*c* may be stably fixed to the inner tube 1411.

The twisted part 1522*a* may include a first section S21 rotated by 180 degrees at the second flat part 1522*c* and a second section S22 rotated by 180 degrees at the front of the first section S21, and a length of the second section S22 may be longer than a length of the first section S21. The twisted part 1522*a* may be formed to become more open as it goes forward in the second section S22. The twisted part 1522*a* of the torsional guide 1522 has the same structure as the twisted part 1521*a* of the mixing bar 1521.

Figure 8:
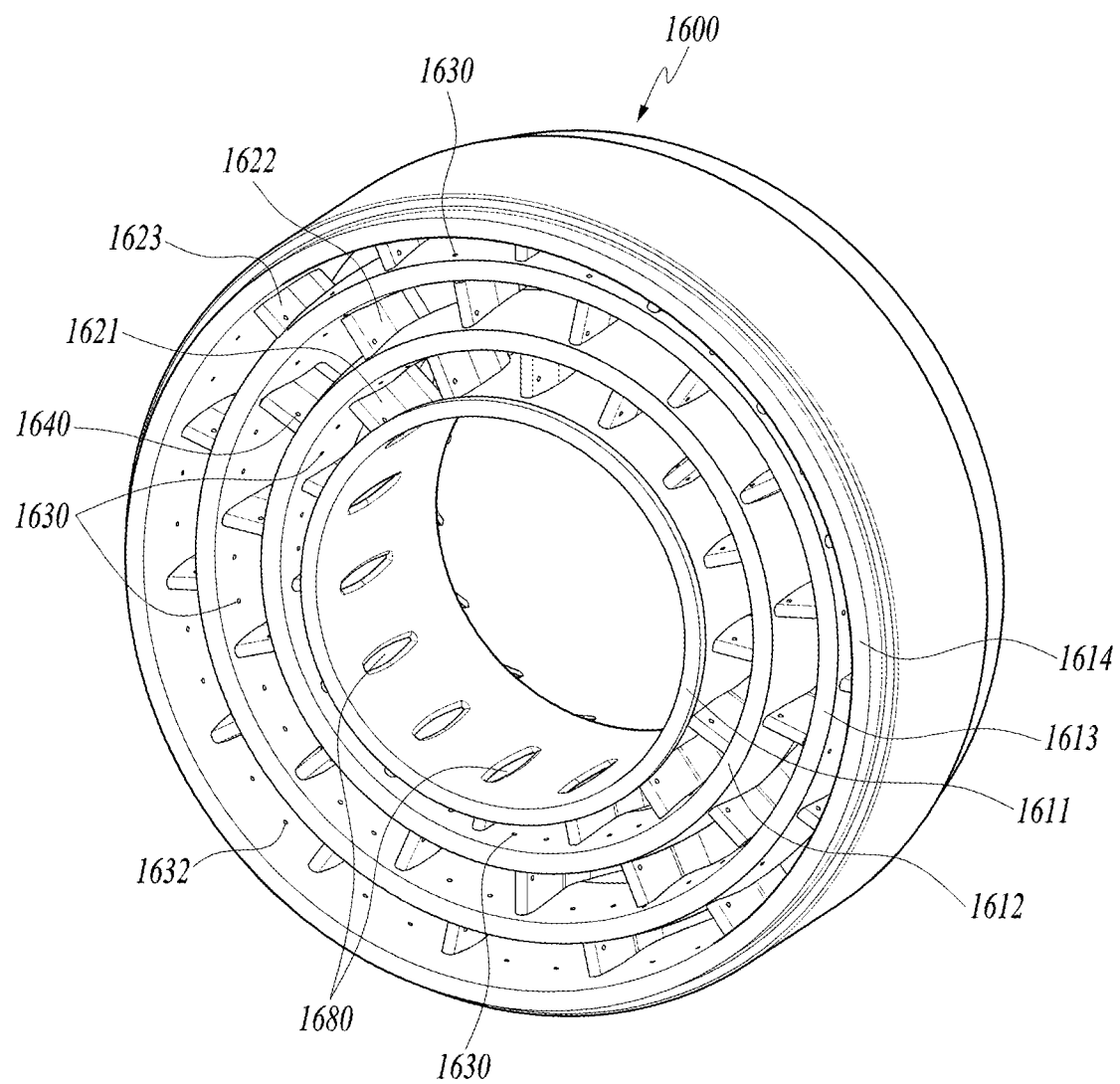
FIG. 8 is a perspective view illustrating a fuel injection module according to the first exemplary embodiment.
Figure 9:
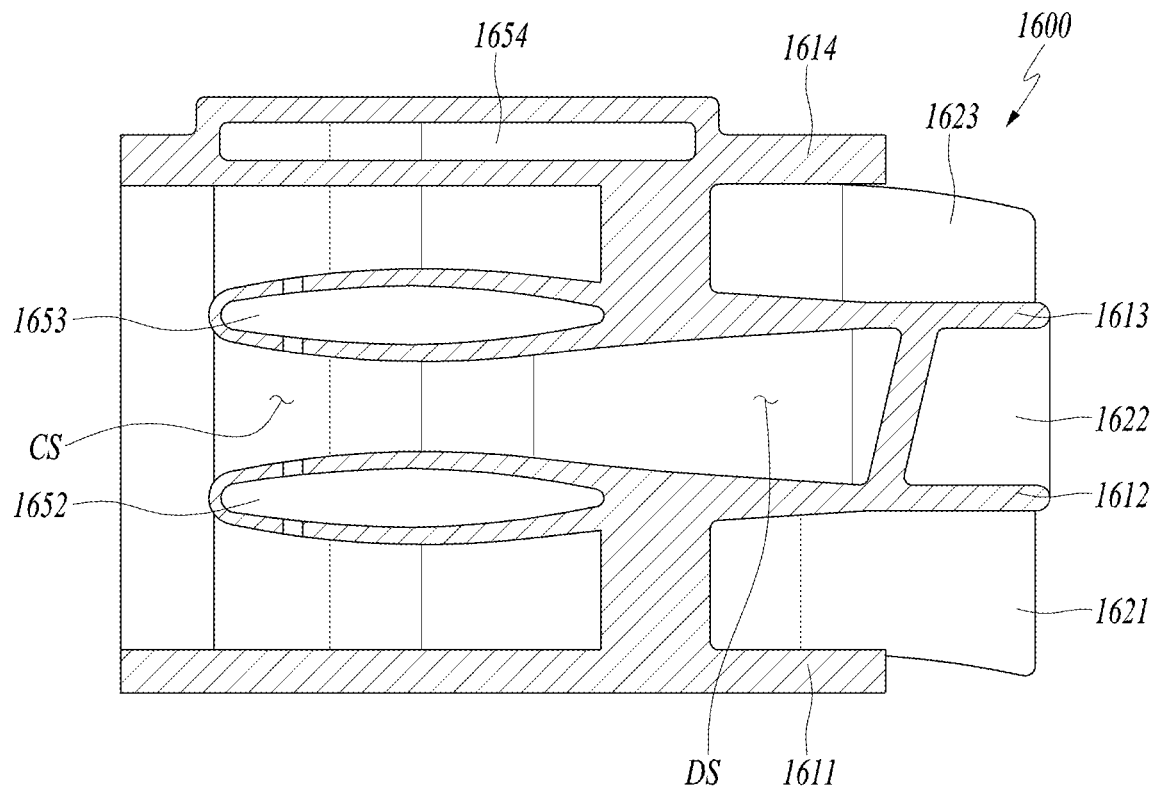
FIG. 9 is a partial cross-sectional view of the fuel injection module according to the first exemplary embodiment.
Figure 10:
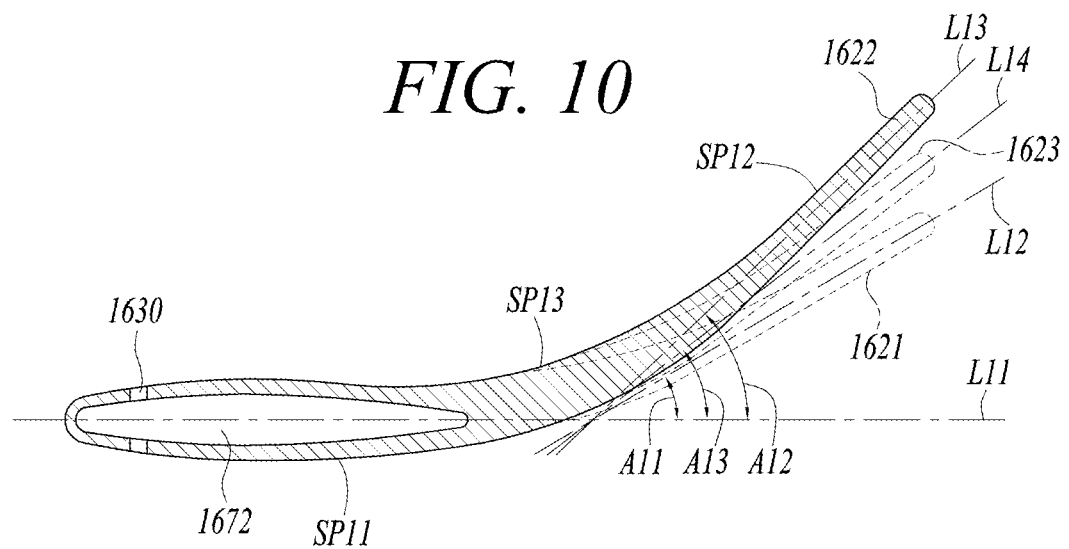
FIG. 10 is a cross-sectional view illustrating struts according to the first exemplary embodiment.

FIG. 8 is a perspective view illustrating a fuel injection module according to the first exemplary embodiment. FIG. 9 is a partial cross-sectional view of the fuel injection module according to the first exemplary embodiment. FIG. 10 is a cross-sectional view illustrating struts according to the first exemplary embodiment.

Referring to FIGS. 4 and 8, the fuel injection module 1600 is connected to the main cylinder 1410 to inject fuel into the first premixing passage 1451. The fuel injection module 1600 has an outer end fitted into the nozzle shroud 1420 and an inner end fitted into the outer tube 1412. The fuel injection module 1600 includes first struts 1621, second struts 1622, third struts 1623, an inner support tube 1611, a first support tube 1612, a second support tube 1613, and an outer support tube 1614.

The inner support tube 1611 may be coupled to the outer tube 1412, and may have a plurality of inlets 1680 through which fuel is introduced. The inlets 1680 are spaced apart in the circumferential direction of the inner support tube 1611. A distribution passage 1651, which extends in the circumferential direction of the outer tube 1412, is formed between the inner support tube 1611 and the outer tube 1412, and the inlets 1680 are connected to the distribution passage 1651.

The first support tube 1612 is coupled to outer ends of the first struts 1621 to support the first struts 1621. The inner support tube 1611 and the first support tube 1612 may have a circular ring shape and may be coaxially disposed.

An intermediate delivery passage 1652 is formed inside the first support tube 1612 to circumferentially extend and is connected to strut passages 1671 formed in the first struts 1621 to receive fuel from the first struts 1621. In addition, the intermediate delivery passage 1652 is connected to strut passages 1672 formed in the second struts 1622 to deliver fuel to the second struts 1622. A plurality of intermediate injection holes 1630 for injecting fuel are formed on the inner and outer surfaces of the first support tube 1612 and are connected to the intermediate delivery passage 1652.

The second support tube 1613 is coupled to outer ends of the second struts 1622 to support the second struts 1622. The second support tube 1613 and the first support tube 1612 may have a circular ring shape and may be coaxially disposed.

An intermediate delivery passage 1653 is formed inside the second support tube 1613 to circumferentially extend and is connected to the strut passages 1672 formed in the second struts 1622 to receive fuel from the second struts 1622. In addition, the intermediate delivery passage 1653 is connected to strut passages 1673 formed in the third struts 1623 to deliver fuel to the third struts 1623. A plurality of intermediate injection holes 1630 for injecting fuel are formed on the inner and outer surfaces of the second support tube 1613 and are connected to the intermediate delivery passage 1653.

Referring to FIG. 9, each of the first and second support tubes 1612 and 1613 has a convexly curved outer surface and a thickness that gradually increases toward the center from the outside in a width direction thereof. Accordingly, between the first support tube 1612 and the second support tube 1613, a contraction region CS in which a passage area gradually decreases forward and an expansion region DS in which a passage area gradually increases forward are defined. Strut injection holes 1640 may be formed in the contraction region CS.

Accordingly, the flow of air and fuel passing through the first and second support tubes 1612 and 1613 may be stabilized. In addition, even if the intermediate delivery passages 1652 and 1653 are formed inside the ring-shaped first and second support tubes 1612 and 1613, it is possible to minimize the interference of the flow due to the first and second support tubes 1612 and 1613.

The outer support tube 1614 is coupled to outer ends of the third struts 1623 to support the third struts 1623. The outer support tube 1614 has a circular ring shape and is fitted into the nozzle shroud 1420 to form the nozzle shroud 1420.

An outer delivery passage 1654 is formed inside the outer support tube 1614 to circumferentially extend and is connected to strut passages 1673 formed in the third struts 1623 to receive fuel from the third struts 1623. A plurality of outer injection holes 1632 for injecting fuel are formed on the inner surface of the outer support tube 1614 and are connected to the outer delivery passage 1654.

Because the outer support tube 1614 forms a portion of the nozzle shroud 1420, the outer delivery passage 1654 and the outer injection holes 1632 may be formed in the nozzle shroud 1420 to inject fuel into the first premixing passage 1451 through the outer support tube 1614.

Each of the first struts 1621 protrudes from the main cylinder 1410 and has the strut injection hole 1640 for injecting fuel. In detail, the first strut 1621 protrudes from the inner support tube 1611 constituting the main cylinder 1410. The strut passage 1671 is formed inside the first strut 1621 and is connected to the outer support tube 1614, the first support tube 1612, and the strut injection hole 1640. The first strut 1621 is positioned between the inner support tube 1611 and the first support tube 1612.

Each of the second struts 1622 protrudes from the first support tube 1612 and has the strut injection hole 1640 for injecting fuel. The strut passage 1672 is formed inside the second strut 1622 and is connected to the first support tube 1612, the second support tube 1613, and the strut injection hole 1640. The second strut 1622 is positioned between the first support tube 1612 and the first support tube 1613.

Each of the third struts 1623 protrudes from the second support tube 1613 and has the strut injection hole 1640 for injecting fuel. The strut passage 1673 is formed inside the third strut 1623 and is connected to the second support tube 1613, the outer support tube 1614, and the strut injection hole 1640.

The third strut 1623 is positioned between the second support tube 1613 and the outer support tube 1614. The second strut 1622 is positioned outside the first strut 1621, and the third strut 1623 is positioned outside the second strut 1622.

Referring to FIG. 10, each of the first strut 1621, the second strut 1622, and the third strut 1623 may include an inflow guide SP11 extending in the longitudinal direction of the main cylinder 1410, a swirl guide SP12 inclined with respect to the longitudinal direction of the main cylinder 1410, and a connection guide SP13 configured to connect the inflow guide SP11 and the swirl guide SP12 and extend in an arc shape. The inflow guides SP11 equalize the flows entering the first, second, and third struts 1621, 1622, and 1623, and the swirl guides SP12 induce the air mixed with the fuel to rotate in the circumferential direction of the main cylinder 1410 to form a swirl.

In order to improve mixing efficiency, the inclined swirl angles of the first strut 1621, the second strut 1622, and the third strut 1623 may be different from each other. A first angle of inclination A11, which is an acute angle formed by an extension line L11 of the inflow guide SP11 of the first strut 1621 and an extension line L12 of the swirl guide SP12 of the first strut 1621, is smaller than a second angle of inclination A12, which is an acute angle formed by an extension line L11 of the inflow guide SP11 of the second strut 1622 and an extension line L13 of the swirl guide SP12 of the second strut 1622. In addition, a third angle of inclination A13, which is an acute angle formed by an extension line L11 of the inflow guide SP11 of the third strut 1623 and an extension line L14 of the swirl guide SP12 of the third strut 1623, is greater than the first angle of inclination A11 and smaller than the second angle of inclination A12. Here, the first angle of inclination A11 may be 22 degrees to 28 degrees, the second angle of inclination A12 may be 45 degrees to 48 degrees, and the third angle of inclination A13 may be 39 degrees to 43 degrees.

Accordingly, the swirl angle of inclination A11 of the inner strut 1621 has the smallest value, the swirl angle of inclination A12 of the central strut 1622 has the largest value, and the swirl angle of inclination A13 of the outer strut 1623 has an intermediate value, so that the inside fuel and the outside fuel are uniformly mixed. Therefore, it is possible to improve the mixing efficiency of fuel and air and reduce emission of nitrogen oxide. In general, in terms of the distribution of flow, the lowest flow velocity occurs at the inner and outer portions of the tube due to friction, whereas the highest flow velocity occurs at the intermediate portion of the tube. However, if the second angle of inclination A12 is the largest, it is possible to easily mix air and fuel because a large swirl is formed in the portion with the greatest velocity, and to achieve uniformity of the overall flow velocity by reducing the longitudinal flow velocity in the central portion.

If the mixing bars 1521 are installed in front of the pegs 1530 according to the first exemplary embodiment, the fuel injected from the pegs 1530 may be efficiently mixed with air by the mixing bars 1521. In addition, because torsional guides 1522 are installed between the mixing bars 1521, fuel and air may be more uniformly mixed by the mixing bars 1521 and the torsional guides 1522.

Further, because the fuel injection module 1600 includes the plurality of struts 1621, 1622, and 1623 and support tubes 1611, 1612, 1613, and 1614 to inject fuel through the struts 1621, 1622, and 1623 and the support tubes 1611, 1612, 1613, and 1614, the fuel may be uniformly injected into the first premixing passage 1451.

Figure 11:
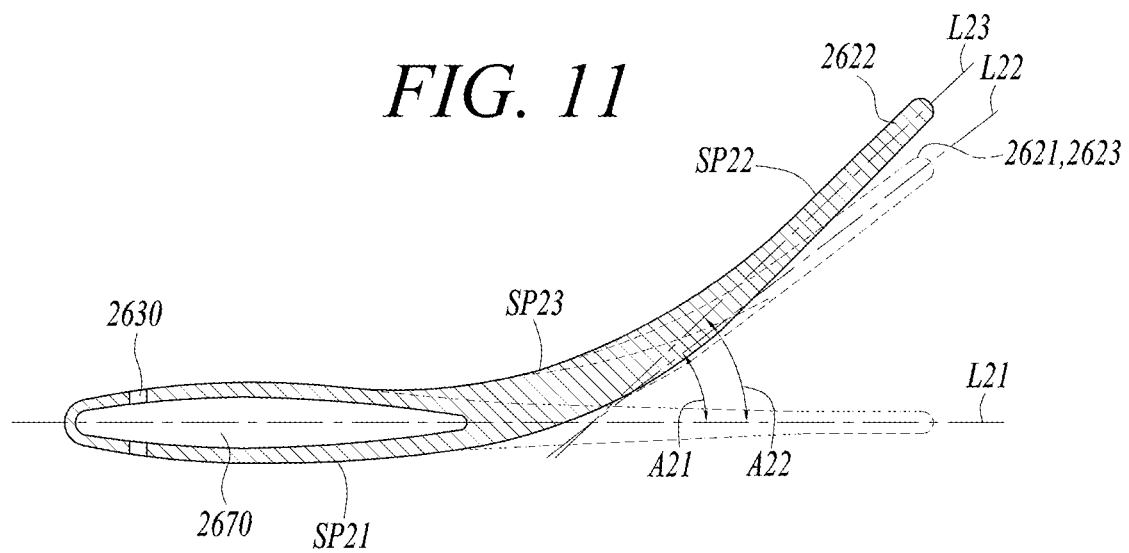
FIG. 11 is a cross-sectional view illustrating struts according to a second exemplary embodiment.

Hereinafter, a gas turbine according to a second exemplary embodiment will be described. FIG. 11 is a cross-sectional view illustrating struts according to a second exemplary embodiment.

Referring to FIG. 11, because the gas turbine according to the second exemplary embodiment has the same structure as the gas turbine according to the first exemplary embodiment except for struts 2621, 2622, and 2623, a redundant description thereof will be omitted.

Each of the first strut 2621, the second strut 2622, and the third strut 2623 may include an inflow guide SP21 extending in the longitudinal direction of the main cylinder 2410, a swirl guide SP22 inclined with respect to the longitudinal direction of the main cylinder 2410, and a connection guide SP23 configured to connect the inflow guide SP21 and the swirl guide SP22 and extend in an arc shape. The inflow guides SP21 equalize the flows entering the struts 2621, 2622, and 2623, and the swirl guides SP22 induce the air mixed with the fuel to rotate in the circumferential direction of the main cylinder 2410 to form a swirl.

In order to improve mixing efficiency, the inclined swirl angles of the first strut 2621, the second strut 2622, and the third strut 2623 may be different from each other. Extension lines L22 of the swirl guide SP22 of the first strut 2621 and the swirl guide SP22 of the third strut 2623 are equal to an extension line L21 and an angle of inclination A21 of the inflow guide SP21. An angle of inclination A22 formed by an extension line L23 of the swirl guide SP22 of the second strut 2622 and an extension line L21 of the inflow guide SP21 may be greater than an angle of inclination A21 formed by an extension line L22 of the swirl guide SP22 of the first strut 2621 and an extension lines L21 of inflow guide SP21.

Figure 12:
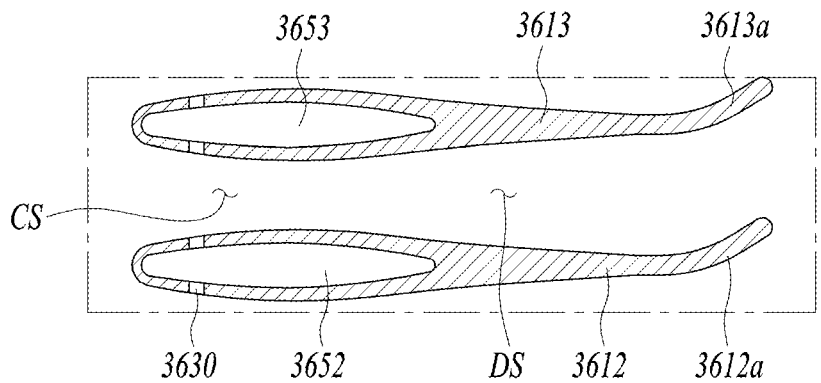
FIG. 12 is a cross-sectional view illustrating a first support tube and a second support tube according to a third exemplary embodiment.

Hereinafter, a gas turbine according to a third exemplary embodiment will be described. FIG. 12 is a cross-sectional view illustrating a first support tube and a second support tube according to the third exemplary embodiment.

Referring to FIG. 12, because the gas turbine according to the third exemplary embodiment has the same structure as the gas turbine according to the first exemplary embodiment except for first and second support tubes 3612 and 3613, a redundant description thereof will be omitted.

The first support tube 3612 has a circular ring shape and is installed to surround the main cylinder. An intermediate delivery passage 3652 is formed inside the first support tube 3612 to circumferentially extend, and a plurality of intermediate injection holes 3630 for injecting fuel are formed on the inner and outer surfaces of the first support tube 3612 and are connected to the intermediate delivery passage 3652.

The second support tube 3613 may have a circular ring shape and may be disposed coaxially with the first support tube 3612. An intermediate delivery passage 3653 is formed inside the second support tube 3613 to circumferentially extend, and a plurality of intermediate injection holes 3630 for injecting fuel are formed on the inner and outer surfaces of the second support tube 3613 and are connected to the intermediate delivery passage 3653.

The first support tube 3612 may have a flared portion 3612a formed at a rear thereof to gradually extend outward, and the second support tube 3613 may have a flared portion 3613a formed at a rear thereof to gradually extend outward. These flared portions 3612a and 3613a may provide more flow to the outer region in which fuel is relatively lean, thereby supplying fuel uniformly as a whole into the nozzles.

As described above, in the combustor nozzle according to the exemplary embodiments, it is possible to efficiently mix fuel and air because the fuel injection module includes the pegs and the support tubes, and to easily mix the fuels injected from the struts because the struts include the swirl guides.

While one or more exemplary embodiments have been described with reference to the accompanying drawings, it will be apparent to those skilled in the art that various variations and modifications may be made by adding, changing, or removing components without departing from the spirit and scope of the disclosure as defined in the appended claims, and these variations and modifications fall within the spirit and scope of the disclosure as defined in the appended claims.

What is claimed is:

1. A combustor nozzle comprising:
a main cylinder;
a nozzle shroud surrounding the main cylinder; and
a fuel injection module disposed between the main cylinder and the nozzle shroud to inject fuel,
wherein the fuel injection module comprises:
a plurality of first struts protruding from the main cylinder and having strut injection holes to inject the fuel,
a first support tube coupled to outer ends of the first struts, and
a plurality of second struts protruding from the first support tube and having strut injection holes to inject the fuel, and
wherein each of the first and second struts comprises a swirl guide inclined with respect to a longitudinal direction of the main cylinder, the swirl guide for each first strut being inclined by a first angle and the swirl guide for each second strut being inclined by a second angle with respect to the longitudinal direction of the main cylinder,
wherein the first angle and the second angle are larger than 0 degrees and smaller than 90 degrees and the first angle is different from the second angle,
wherein the main cylinder comprises an inner tube and an outer tube surrounding the inner tube, and a plurality of pegs for injecting the fuel to guide a flow of air and mixing bars for mixing the air and the fuel injected from the pegs are installed between the inner tube and the outer tube, each of the mixing bars being twisted,
wherein each mixing bar comprises a twisted part and a first flat part fixed to a downstream end of the twisted part, and the twisted part has an upstream end fixed to a downstream end of an associated one of the plurality of pegs,
wherein the twisted part of each mixing bar comprises a first section rotated by 180 degrees and a second section positioned downstream of the first section and rotated by 180 degrees, the second section having a greater length than the first section, and
wherein upstream and downstream directions are in reference to the flow of the air through the main cylinder.

2. The combustor nozzle according to claim 1, wherein the second angle is larger than the first angle, making each second strut more inclined than each first strut with respect to the longitudinal direction of the main cylinder.

3. The combustor nozzle according to claim 2,
wherein each of the first and second struts further comprises an inflow guide extending in the longitudinal direction of the main cylinder, and
wherein the first angle is defined as an acute angle formed by an extension line of the inflow guide of each first strut and an extension line of the swirl guide of each first strut and the second angle is defined as an acute angle formed by an extension line of the inflow guide of each second strut and an extension line of the swirl guide of each second strut.

4. The combustor nozzle according to claim 1, wherein a plurality of intermediate injection holes for injecting the fuel are formed in the first support tube.

5. The combustor nozzle according to claim 1, wherein a contraction region in which a passage area gradually decreases and an expansion region in which the passage area gradually increases are formed between the first support tube and a second support tube.

6. The combustor nozzle according to claim 5, wherein the strut injection holes are formed in the contraction region.

7. The combustor nozzle according to claim 1, wherein an intermediate delivery passage is formed in the first support tube and extends circumferentially.

8. The combustor nozzle according to claim 7, wherein each of the first and second struts has a strut passage formed to extend in a height direction of each respective first or second strut, and the intermediate delivery passage is connected to the strut passage.

9. The combustor nozzle according to claim 1, wherein
the fuel injection module further comprises a second support tube configured to connect outer sides of the second struts and a plurality of third struts protruding from the second support tube,
each third strut comprises a swirl guide inclined by a third angle with respect to the longitudinal direction of the main cylinder, the third angle is larger than 0 degrees and smaller than 90 degrees,
the second angle is larger than the first angle, making each second strut is more inclined than each first strut, and
third angle is larger than the first angle and smaller than the second angle, making each third strut is more inclined than each first strut and less inclined than each second strut.

10. The combustor nozzle according to claim 9, wherein
each of the first, second, and third struts further comprises an inflow guide extending in the longitudinal direction of the main cylinder, and
the first angle is defined as an acute angle formed by an extension line of the inflow guide of each first strut and an extension line of the swirl guide of each first strut and the second angle is defined as an acute angle formed by an extension line of the inflow guide of each second strut and an extension line of the swirl guide of each second strut, and the third angle is defined as an acute angle formed by an extension line of the inflow guide of each third strut and an extension line of the swirl guide of each third strut.

11. The combustor nozzle according to claim 1, wherein each of the plurality of pegs includes a connection passage to supply the fuel to the fuel injection module and an injection passage to supply the fuel to an injection hole formed in an inner vane, the connection passage being separated from the injection passage.

12. The combustor nozzle according to claim 1, wherein a torsional guide is installed between the mixing bars, and the torsional guide is twisted with respect to a central axis thereof.

13. The combustor nozzle according to claim 12, wherein the torsional guide comprises a twisted guide part, a first flat guide part fixed to a downstream end of the twisted guide part, and a second flat guide part fixed to an upstream end of the twisted guide part, and the first and second flat guide parts are disposed parallel to a radial direction of the main cylinder.

14. A combustor comprising:
a burner having a plurality of nozzles configured to inject fuel and air; and a duct assembly coupled to one side of the burner to burn a mixture of the fuel and air and transmit combustion gas to a turbine, wherein each of the plurality of nozzles comprises:

a main cylinder; a nozzle shroud surrounding the main cylinder; and a fuel injection module disposed between the main cylinder and the nozzle shroud to inject the fuel, wherein the fuel injection module comprises:

a plurality of first struts protruding from the main cylinder and having strut injection holes to inject the fuel;

a first support tube coupled to outer ends of the first struts; and a plurality of second struts protruding from the support tube and having strut injection holes to inject the fuel, and wherein each of the first and second struts comprises a swirl guide inclined with respect to a longitudinal direction of the main cylinder, the swirl guide for each first strut being inclined by a first angle and the swirl guide for each second strut being inclined by a second angle with respect to the longitudinal direction of the main cylinder, wherein the first angle and the second angle are larger than 0 degrees and smaller than 90 degrees and the first angle is different from the second angle, wherein the main cylinder comprises an inner tube and an outer tube surrounding the inner tube, and a plurality of pegs for injecting the fuel to guide a flow of the air and mixing bars for mixing the air and the fuel injected from the pegs are installed between the inner tube and the outer tube, each of the mixing bars being twisted, wherein each mixing bar comprises a twisted part and a first flat part fixed to a downstream end of the twisted part, and the twisted part has an upstream end fixed to a downstream end of an associated one of the plurality of pegs, wherein the twisted part of each mixing bar comprises a first section rotated by 180 degrees and a second section positioned in downstream of the first section and rotated by 180 degrees, the second section having a greater length than the first section, and wherein upstream and downstream directions are in reference to the flow of the air through the main cylinder.

15. The combustor according to claim 14, wherein the second angle is larger than the first angle, making each second strut more inclined than each first strut with respect to the longitudinal direction of the main cylinder.

16. A gas turbine comprising:

a compressor configured to compress air introduced from an outside;

a combustor configured to mix fuel with the air compressed by the compressor and combust a mixture of the fuel and air to produce combustion gas; and a turbine having a plurality of turbine blades rotated by the combustion gas produced by the combustor, wherein the combustor comprises a burner having a plurality of nozzles configured to inject the fuel and air, and a duct assembly coupled to one side of the burner to burn the mixture of the fuel and air and transmit the combustion gas to the turbine, wherein each of the plurality of nozzles comprises:

a main cylinder;

a nozzle shroud surrounding the main cylinder; and a fuel injection module disposed between the main cylinder and the nozzle shroud to inject the fuel, wherein the fuel injection module comprises:

a plurality of first struts protruding from the main cylinder and having strut injection holes to inject the fuel;

a first support tube coupled to outer ends of the first struts; and a plurality of second struts protruding from the support tube and having strut injection holes to inject the fuel, and wherein each of the first and second struts comprises a swirl guide inclined with respect to a longitudinal direction of the main cylinder, the swirl guide for each first strut being inclined by a first angle and the swirl guide for each second strut being inclined by a second angle with respect to the longitudinal direction of the main cylinder, and wherein the first angle and the second angle are larger than 0 degrees and smaller than 90 degrees and the first angle is different from the second angle, wherein the main cylinder comprises an inner tube and an outer tube surrounding the inner tube, and a plurality of pegs for injecting the fuel to guide a flow of the air and mixing bars for mixing the air and the fuel injected from the pegs are installed between the inner tube and the outer tube, each of the mixing bars being twisted, wherein each mixing bar comprises a twisted part and a first flat part fixed to a downstream end of the twisted part, and the twisted part has an upstream end fixed to a downstream end of an associated one of the plurality of pegs, wherein the twisted part of each mixing bar comprises a first section rotated by 180 degrees and a second section positioned downstream of the first section and rotated by 180 degrees, the second section having a greater length than the first section, and wherein upstream and downstream directions are in reference to the flow of the air through the main cylinder.

17. The gas turbine according to claim 16, wherein the second angle is larger than the first angle, making each second strut more inclined than each first strut with respect to the longitudinal direction of the main cylinder.

* * * * *